Aug. 5, 1952     J. B. ARMITAGE ET AL     2,605,678
MILLING AND BORING MACHINE

Filed June 28, 1946     8 Sheets-Sheet 1

Inventors
Joseph B. Armitage
Orrin W. Barker
By W. D. O'Connor
Attorney

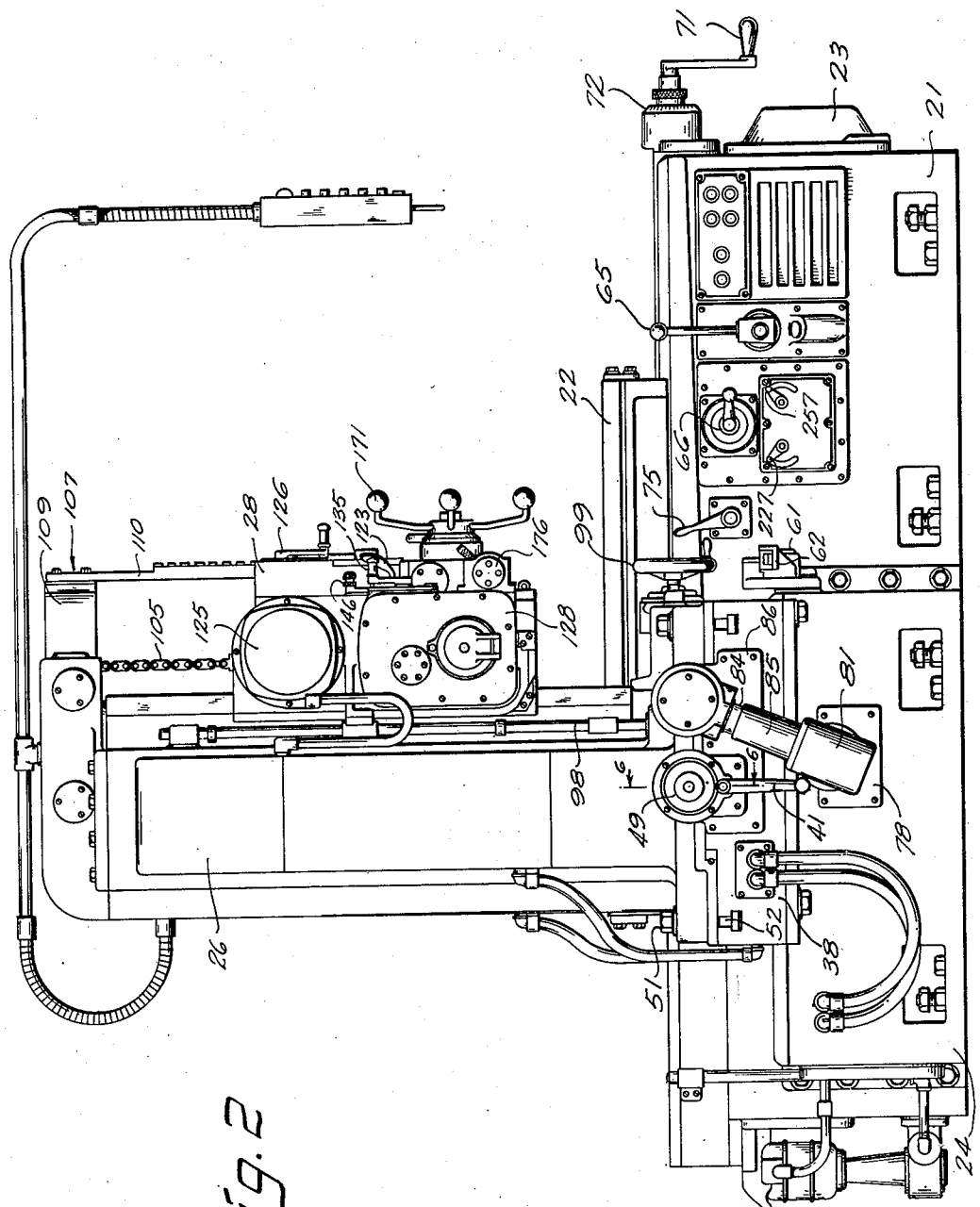

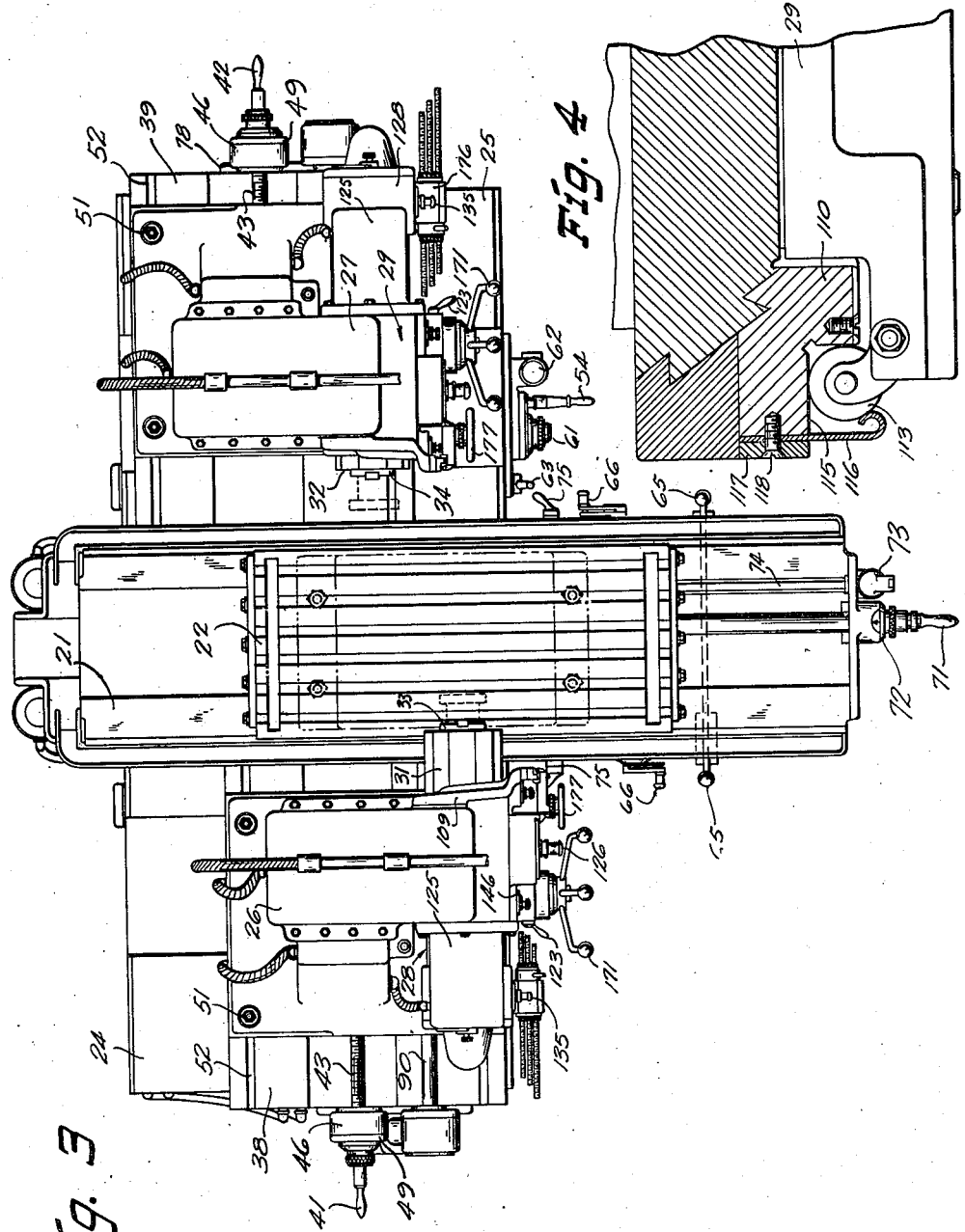

Aug. 5, 1952   J. B. ARMITAGE ET AL   2,605,678
MILLING AND BORING MACHINE
Filed June 28, 1946   8 Sheets-Sheet 4

INVENTOR
Joseph B. Armitage
Orrin W. Barker
BY W. D. O'Connor
ATTORNEY

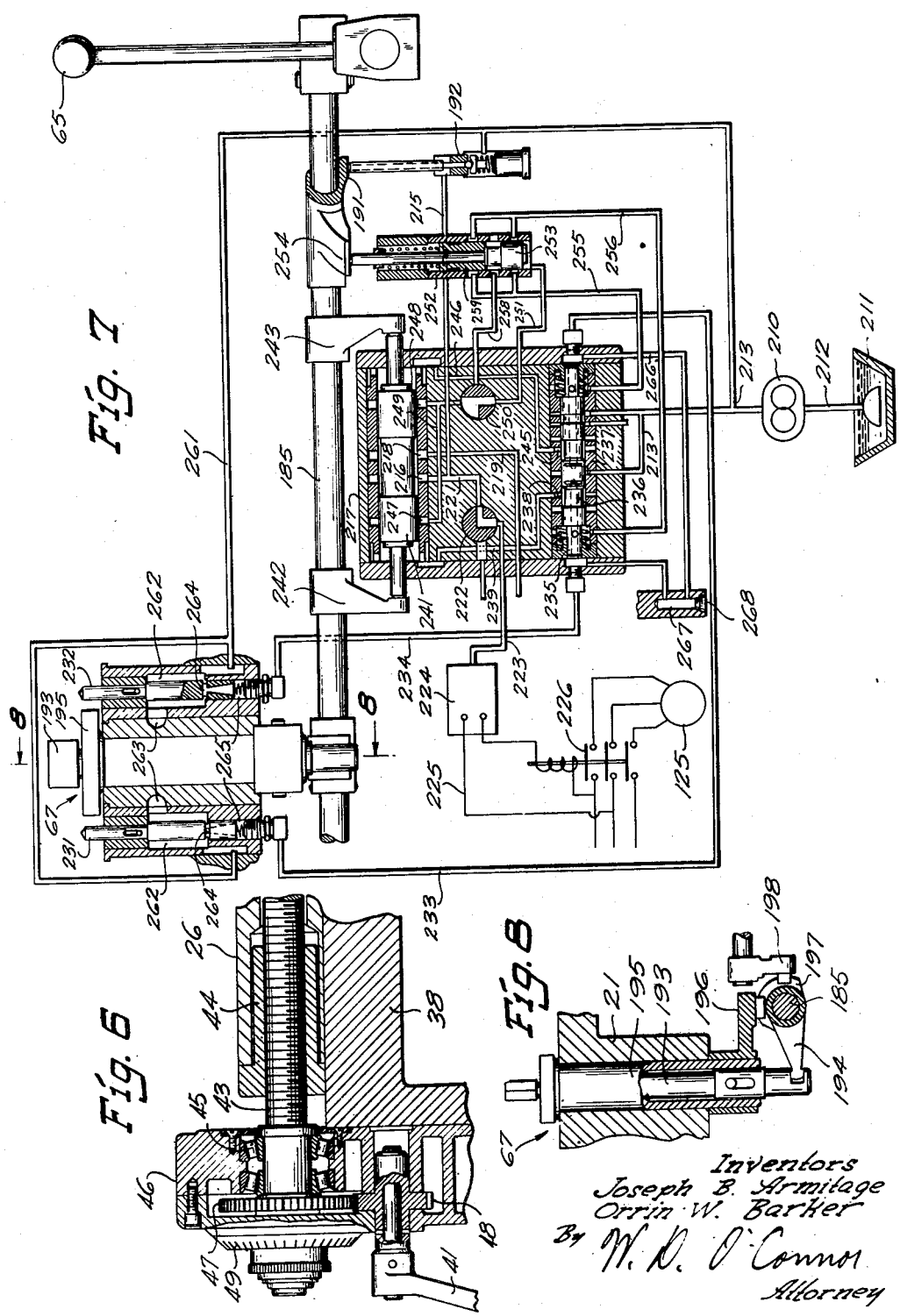

Aug. 5, 1952  J. B. ARMITAGE ET AL  2,605,678
MILLING AND BORING MACHINE
Filed June 28, 1946  8 Sheets-Sheet 6
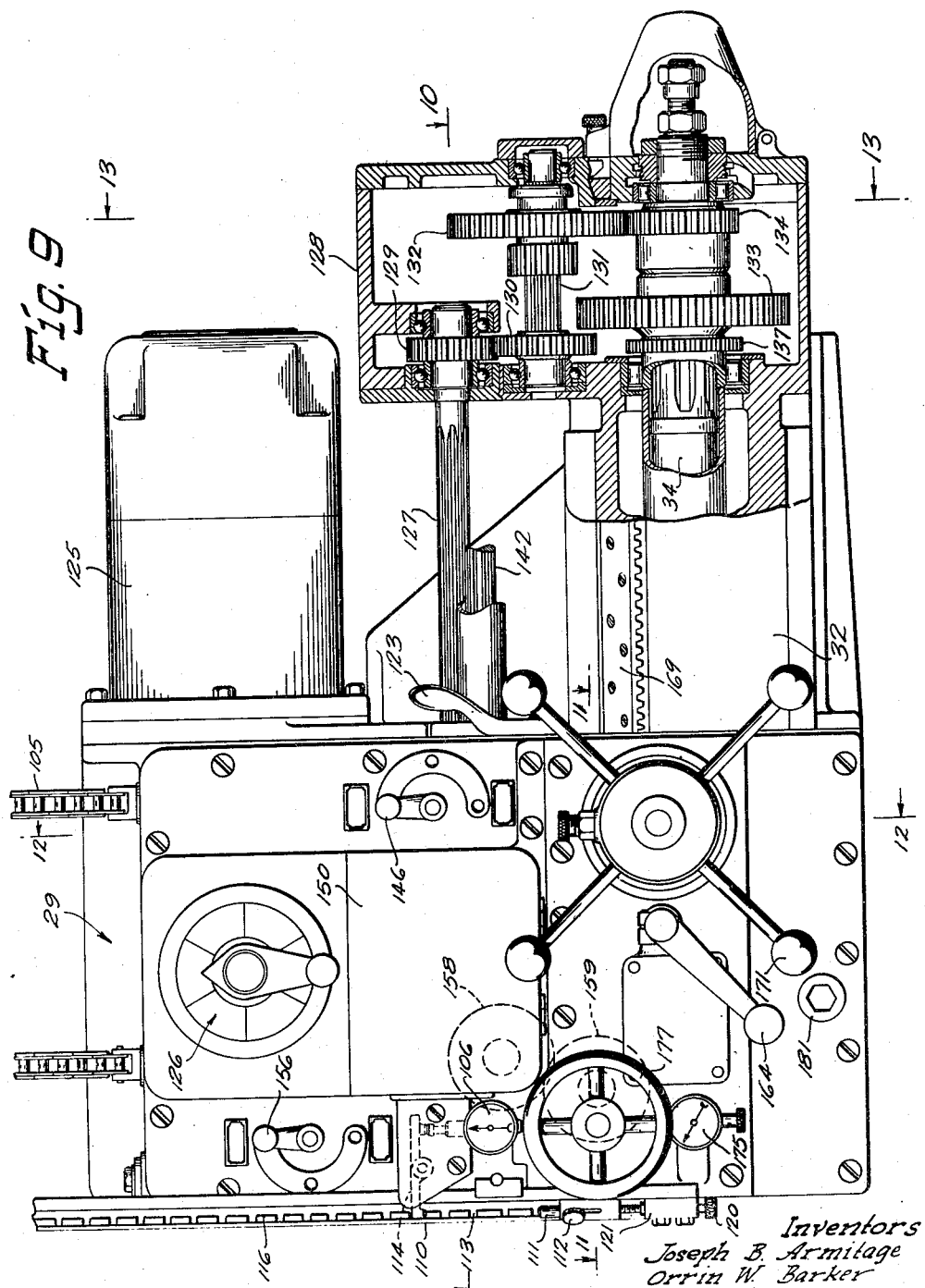
Inventors
Joseph B. Armitage
Orrin W. Barker
W. D. O'Connor
Attorney

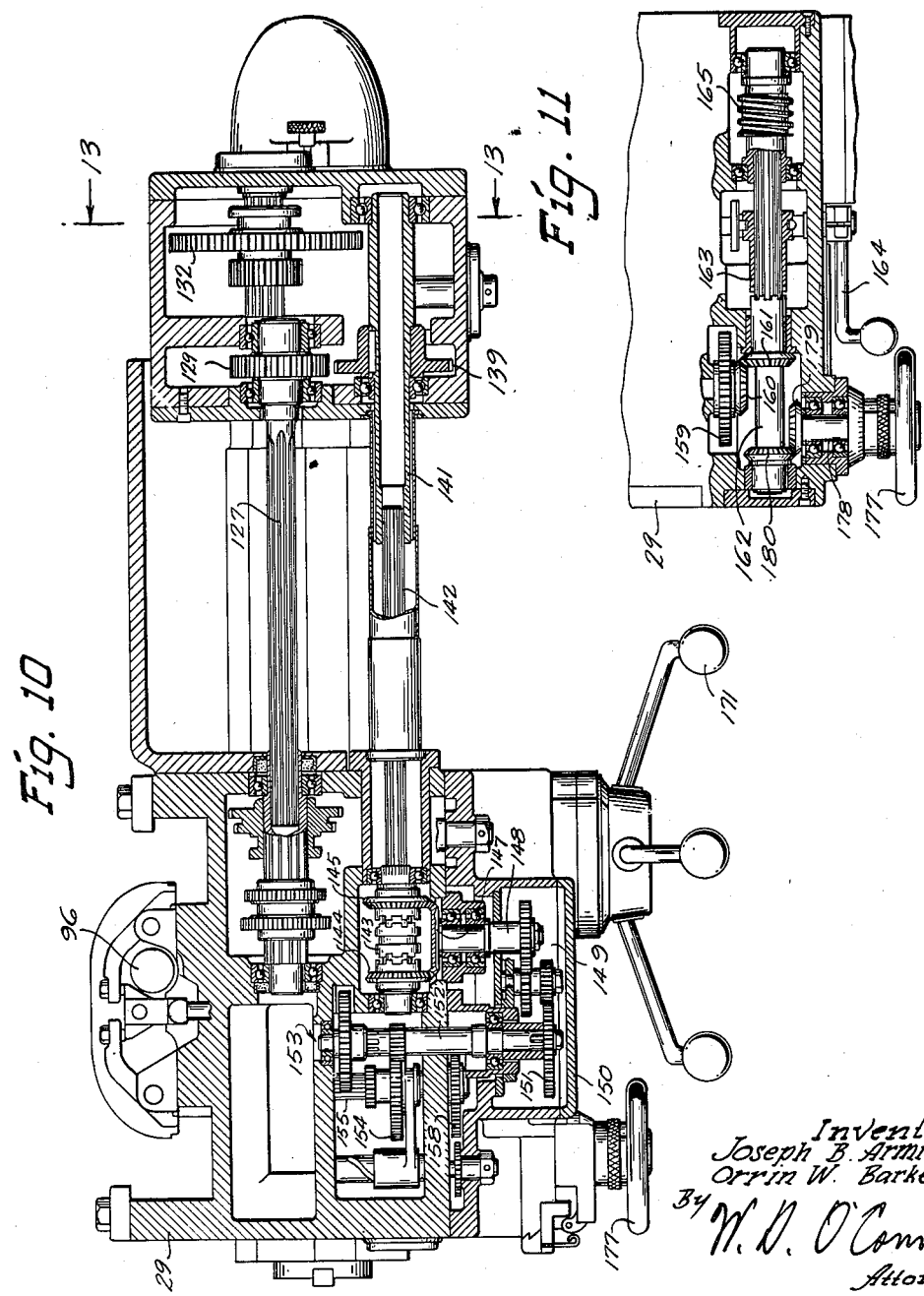

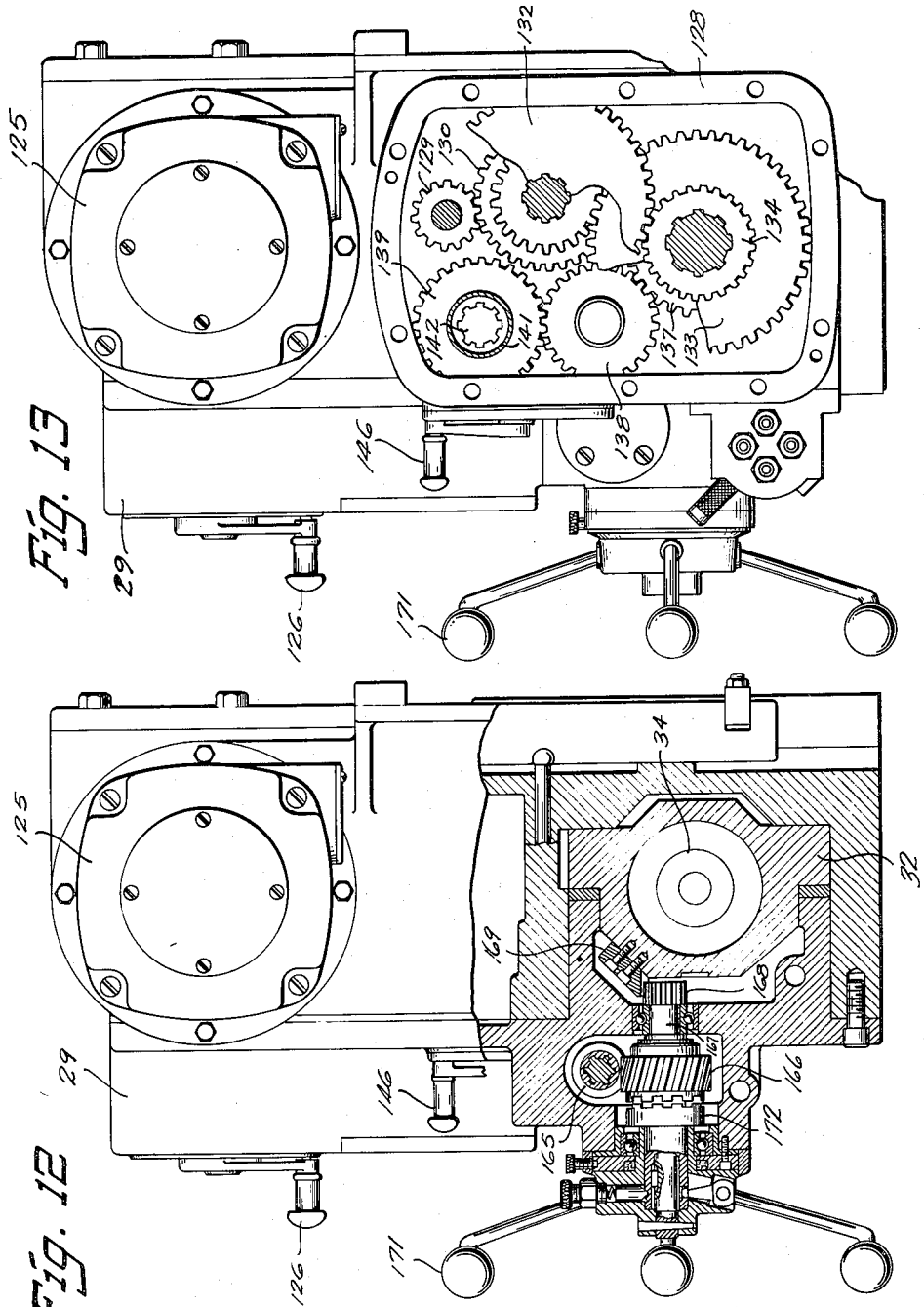

Patented Aug. 5, 1952

2,605,678

UNITED STATES PATENT OFFICE 2,605,678

MILLING AND BORING MACHINE

Joseph B. Armitage, Wauwatosa, and Orrin W. Barker, Milwaukee, Wis., assignors to Kearney & Trecker Corporation, West Allis, Wis., a corporation of Wisconsin Application June 28, 1946, Serial No. 680,256

19 Claims. (Cl. 90—16)

This invention relates generally to machine tools and more particularly to improved supporting structure and driving mechanism for the rotary cutters of a milling and boring machine.

A general object of the invention is to provide an improved machine tool that is adapted to perform milling and boring operations with facility and a high degree of precision.

Another object of the invention is to provide a milling and boring machine especially adapted to operate simultaneously at various positions on opposite sides of a work piece.

Another object is to provide a machine tool of the milling and boring type, having a plurality of cutter carrying columns arranged for relative movement in a plurality of directions.

Another object is to provide a milling and boring machine in which cutter carrying columns have relative movement laterally of as well as toward and from each other.

Another object is to provide an improved milling and boring machine of the horizontal opposed spindle type, in which the spindles may be displaced transversely of each other in both vertical and horizontal directions.

Another object is to provide an improved milling and boring machine in which the cutter carrying column is arranged for movement both longitudinally of and transversely of the work supporting table.

Another object is to provide a milling and boring machine in which a spindle carrying column is mounted for movement in a plurality of directions on the machine bed and in which means are provided for transmitting power from the machine bed to the movable column for operating mechanism mounted on the column.

Another object of the invention is to provide an improved control system for a machine tool.

Another object is to provide an improved machine tool control mechanism in which a control valve is operated by tripping plungers through interconnecting hydraulic conduits.

Another object is to provide an improved machine tool control system wherein a control rod is turned and moved endwise to effect separate control functions.

Another object is to provide an improved control mechanism for a machine tool drive in which a single control rod operates through rotative and longitudinal movements to control both the rate and direction of the driving action.

Another object is to provide an improved control system for a milling machine in which a hydraulic control system operates a pressure responsive switch to effect automatic stopping of the spindle.

Another object is to provide an improved feeding mechanism for the spindle carrying ram of a milling machine.

Another object is to provide an improved precision positioning apparatus for a machine tool.

A further object is to provide an improved precision arrangement for holding measuring rods in a precision positioning apparatus for a machine tool.

According to this invention, a milling and boring machine having a fixed base carrying a work supporting table is provided with cutter spindles carried by columns and arranged for relative movement in manner to provide for displacing the spindles transversely of each other both in a horizontal plane and in a vertical plane for operation in staggered relationship. This is accomplished by providing for horizontal movement of the columns longitudinally of the table as well as toward and from the table, the spindles being carried by heads arranged for vertical movement along the columns. By this arrangement, both sides of a work piece may be operated upon simultaneously in any combination of positions within the range of movement. Power for effecting vertical feeding movements of the spindle heads is transmitted from table driving mechanism in the base through extensible transmission mechanism to the movably mounted columns. Movement of the machine table is controlled by an improved control mechanism including novel mechanical linkage working in conjunction with trip posts that operate through hydraulic columns and with a hydraulic circuit incorporating a pressure actuated switch for stopping the spindle motor. Also, improved mechanism is provided for effecting feeding movements of the spindle ram, and improved positioning means, including a new arrangement for holding measuring rods, is employed for positioning the spindle heads.

The foregoing and other objects of the invention, which will become more fully apparent from the following disclosure, may be achieved by means of the particular machine tool herein described in connection with, and depicted in the accompanying drawings, in which:

Fig. 2 is a view in side elevation of the machine tool shown in Fig. 1;

Fig. 3 is a plan view of the machine shown in Figs. 1 and 2, the opposed spindles being positioned in staggered relationship;

Fig. 4 is an enlarged detailed view in horizontal section on the plane represented by the line 4—4 in Fig. 1 and showing the measuring rod holder;

Fig. 6 is a detailed fragmentary view of part of the column moving mechanism shown at the left in Fig. 5, taken on the plane represented by the lines 6—6 in Fig. 2;

Fig. 7 is a schematic diagram of the control apparatus for controlling movement of the work supporting table and spindle heads;

Fig. 8 is a fragmentary detailed view of the table trip post mechanism, taken on the plane represented by the line 8—8 in Fig. 7;

Fig. 9 is an enlarged view in elevation of the spindle head shown on the right column in Fig. 1, with parts broken away to show the spindle driving train;

Fig. 10 is a view in horizontal section through the spindle head, taken on the plane represented by the line 10—10 in Fig. 9;

Fig. 11 is a fragmentary view in horizontal section through the spindle head, taken on the plane represented by the line 11—11 in Fig. 9;

Figure 1:
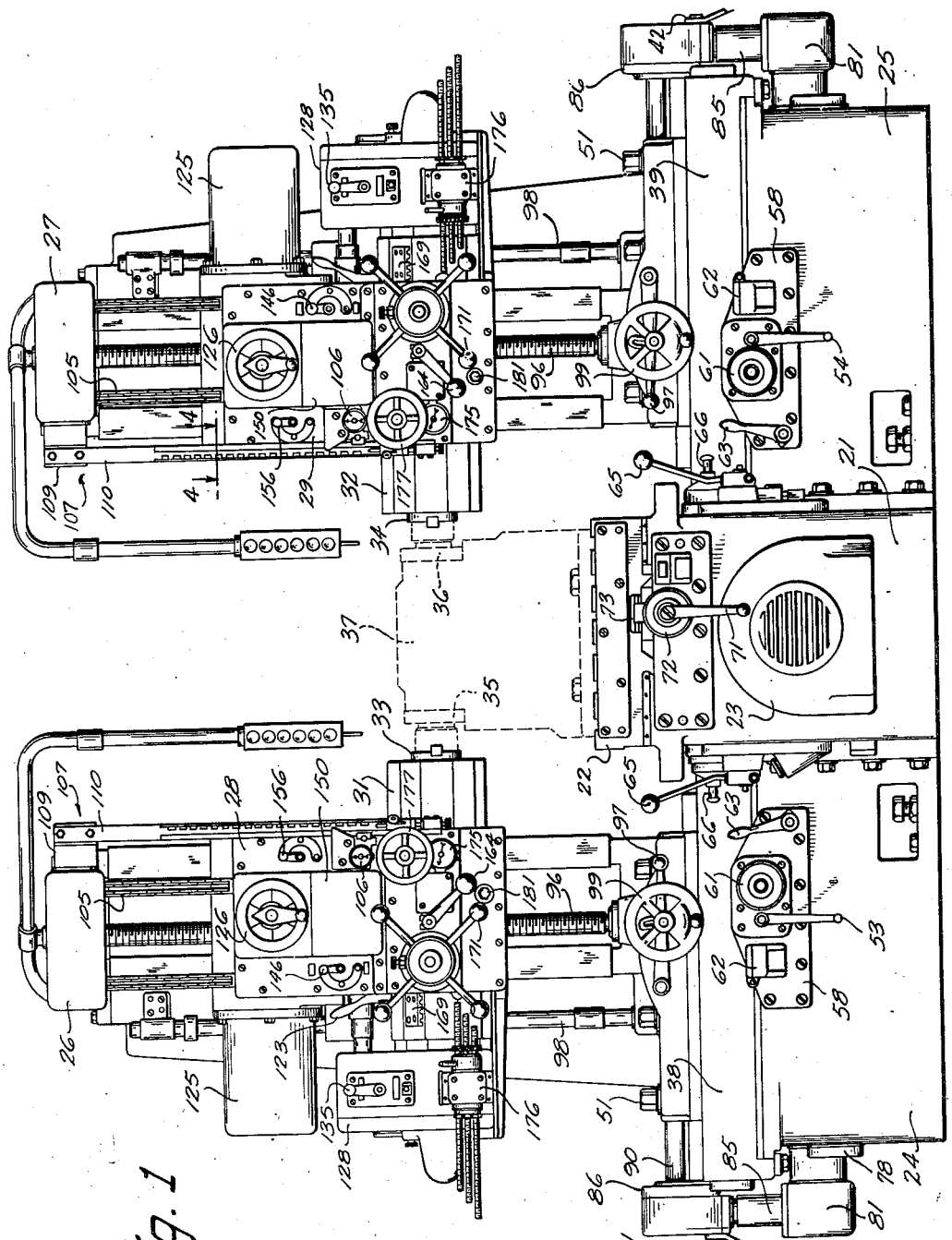
Figure 1 is a general view in front elevation of a two spindle milling and boring machine embodying the various features of this invention.

Fig. 12 is a view of the spindle head taken partially in vertical section on the plane represented by the line 12—12 in Fig. 9; and Fig. 13 is a detailed view in vertical section through the spindle driving mechanism, taken on the plane represented by the lines 13—13 in Figs. 9 and 10.

The particular machine tool shown in the drawings as exemplifying apparatus constituting a preferred embodiment of the invention, is a horizontal milling and boring machine of the double opposed spindle type, although it is to be understood that various features of the invention may be utilized with equal advantage in other machine tools of different construction.

Referring more specifically to the drawings and particularly to Figs. 1, 2 and 3 thereof, the milling and boring machine shown generally therein, is fully described hereinafter, by way of a complete disclosure of practical apparatus embodying the invention. As there shown, it will be seen that the machine comprises essentially a hollow bed or base 21 constituting the foundation or main frame of the machine and forming a housing for some of its actuating mechanism. Slidably mounted on the top of the bed 21 is a work supporting table 22 that is arranged to be reciprocated longitudinally in feeding or traversing movements by a driving motor (not shown) that is enclosed within the bed 21 and is accessible through opening a door 23 at the end of the bed. The motor is operatively connected, by means of the usual actuating mechanism, for effecting movement of the table in either direction at a selected rate of speed.

As shown in Figs. 1 and 3, the base or bed 21 is provided at its respective sides with laterally projecting bed extensions 24 and 25, which serve to support uprising spindle-head carrying columns 26 and 27 at opposite sides, respectively, of the table 22. Slidably mounted for independent vertical movement along the supporting columns 26 and 27, are cutter spindle-heads 28 and 29, respectively. The spindle heads 28 and 29 constitute self-contained units, provided with horizontally movable spindle carrying rams 31 and 32, respectively, which rotatably support cutter driving spindle 33 and 34; the arrangement being such, that the spindles are so disposed as to cooperate with the work table 22 in opposed relationship in manner to engage cutters 35 and 36, mounted on the respective spindles, with the opposite sides of a work piece 37 carried by the table 22.

The positions of the cutters 35 and 36 may be adjusted in vertical direction by moving the spindle heads 28 and 29 vertically along their respective columns as required. Adjustment of the cutters 35 and 36, toward or from the work piece 37, may be effected by advancing or retracting the respective supporting rams 31 and 32 through sliding them in or out of the spindle heads. In adapting the machine to operate on work pieces of various sizes, further adjustment of the cutters toward or from each other, may be effected by moving the columns 26 and 27 along the bed extensions 24 and 25, toward or from the table 22 as may be required.

In order that the cutters 35 and 36 may be caused to operate simultaneously in any combination of positions on the opposite sides of the work piece 37, provision is made for effecting a further adjusting movement in direction mutually transverse to the directions of the up and down and in and out movements. This is accomplished through providing for movement of the supporting columns 26 and 27 in direction longitudinally of or parallel with the table 22. To this end, the columns 26 and 27 are supported upon the extensions 24 and 25 by means of interposed saddles 38 and 39. As best seen in Fig. 3, the columns are slidably mounted upon the saddles for movement toward or from the table 22, while the saddles are in turn slidably mounted upon the bed extensions for movement parallel with the table.

Movement of the columns 26 and 27, along the saddles 38 and 39, may be effected by turning hand cranks 41 and 42 at the outer ends of the saddles. As best shown in the enlarged view, Fig. 5, the mechanism for moving column 26, comprises a screw 43, that is rotatably carried by the saddle 38 and has cooperating threaded engagement with a nut 44, fixed in the base of the column, a similar screw and nut mechanism being provided for moving the column 27. As shown in detail in Fig. 6, the screw 43 is rotatably supported by bearings 45, carried in a bracket 46, that is secured to the end of the saddle 38. A gear wheel 47, fixed on the screw 43, has meshing engagement with a pinion 48, fixed on the hand crank 41, which is likewise rotatably mounted in the bracket, the gearing being arranged to provide a mechanical advantage in rotating the screw. For indicating the extent of movement of the column along the saddle, the screw 43 is provided at its outer end with a micrometer reference dial 49. After the column has been adjusted to the desired distance from the table, it may be clamped to the saddle by tightening clamping bolts 51 that operate in T-slots 52 in the upper surface of the saddle, as shown in Fig. 3.

Movement of the saddles 38 and 39 along the bed extensions 24 and 25, in direction parallel with the table 22, is effected in similar manner by actuating hand cranks 53 and 54, respectively. As indicated by dotted lines in Fig. 5, the crank 53 operates through a pinion 55 and a gear 56 to turn a screw 57 in a manner similar to the mechanism shown in Fig. 6. The screw 57 is rotatably mounted in a bracket 58, secured to the side of the bed extension 24 and cooperates with a nut 59, fixed in the saddle 38. A micrometer dial 61, is fixed on the outer end of each screw 57, for indicating the extent of movement of the saddle along the bed extension. As shown in Fig. 1, more precise positioning of the saddle may be effected by moving it under the guidance of a sensitive dial indicator 62, operating in conjunction with measuring rods in a well known manner.

After the saddles have been moved to effect the desired positioning of the columns longitudinally of the table, each saddle may be clamped to its associated bed extension by actuating a clamping lever 63, mounted on the bracket 58.

By this arrangement providing both longitudinal and transverse adjustments of the cutter carrying columns relative to the table and vertical adjustment of the spindle heads, the milling cutters 35 and 36 may assume any relative position within the range of the machine for simultaneous operation on opposite sides of a workpiece.

Figure 5:
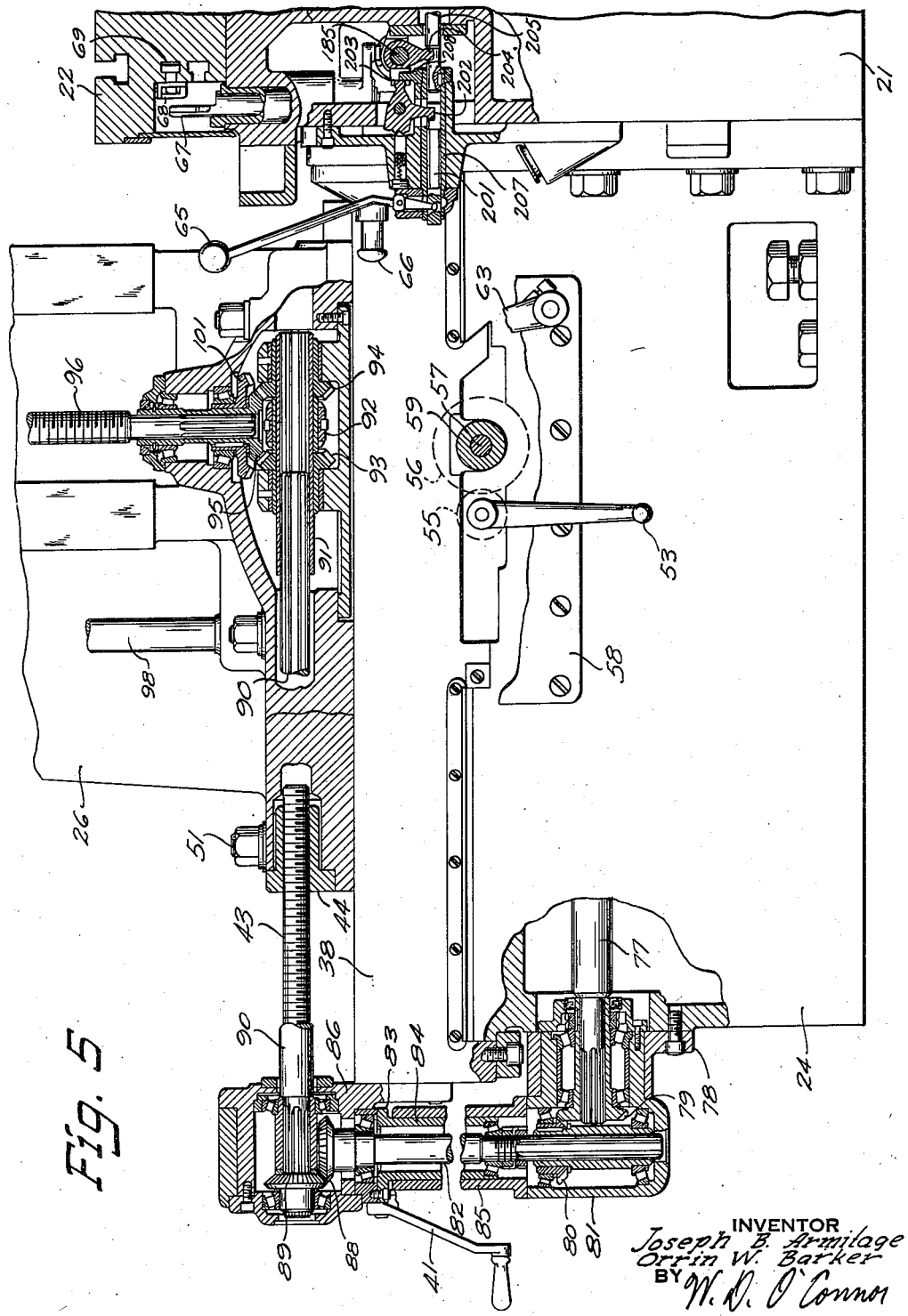
Fig. 5 is an enlarged fragmentary view, partly in elevation and partly in vertical section, of the lower part of the left column and its supporting base, showing the arrangement for moving the column in a plurality of directions.

The power driven mechanism within the bed 21, operates to actuate the table 22 under the control of duplicate hand levers 65, mounted on opposite sides of the bed 21, as shown in Figs. 1 and 5. When either of the control levers 65 is pivoted to the right or to the left, the table 22 is caused to move in the corresponding direction. Likewise, when either of the levers is pivoted outward or away from the bed 21, movement of the table occurs at rapid traverse rate. On the other hand, if either lever is pivoted to the inward position movement of the table occurs at feed rate, the rate being determined by the adjustment of feed rate selecting and indicating mechanism 66, which actuates the usual feed rate changing mechanism within the bed 21 in a well known manner. As shown in Figs. 5 and 7, changes in the direction or rate of movement may also be effected automatically through operation of a tripping mechanism or trip post assembly 67, that may be actuated by tripping dogs 68 mounted in T-slots 69 in the forward face of the table 22. Movement of the table 22 may also be effected manually by actuating a hand crank 71, mounted on the end of the bed 22, the position of the table being determined by the aid of a micrometer dial 72 and a dial indicator 73 that cooperates with measuring rods 74 (Fig. 3), in the usual manner. When the table has been properly positioned, it may be clamped to the bed 21 by actuating either of two clamping levers 75, at opposite sides of the bed, respectively.

Vertical movement of the heads 28 and 29, along the columns 26 and 27, likewise may be effected by power derived from the table actuating mechanism in the base 21, the rate of movement being determined by the mechanism which establishes the rate of table movement. To this end, power is transmitted from the bed 21 to the movable columns, through the agency of extensible transmission mechanism, regardless of the positions of the columns relative to the bed extensions.

The power transmission trains to the two columns are similar in structure, the mechanism associated with column 26, being shown in detail in Fig. 5. As there shown, power is transmitted at the selected rate from the actuating mechanism within the bed 21 by means of a horizontal shaft 77, which extends outwardly from within the bed through the bed extension 24. At its outer end, the shaft 77 projects into and is journalled in a bracket 78, secured to the end of the bed extension. The projecting end of the shaft 77, is fitted with a bevel pinion 79, that meshes with a mating pinion 80, that is journalled in a housing 81, pivotally mounted on the bracket 78 for swiveling movement about the shaft 77 as a center. The bevel pinion 80 has sliding splined connection with a cardan shaft 82, that is journalled in a housing 83, having a tubular portion 84 that incloses the shaft 82 and has telescopic engagement with a similar tubular portion 85 extending upward from the housing 81. The housing 83 is in turn, pivotally mounted at its upper end upon a bracket 86 that is attached to the end of the movable saddle 38, the arrangement being such, that when the saddle 38 is moved along the bed extension 24, the housings 81 and 83 are free to pivot upon their supporting brackets and to telescope upon each other as the cardan shaft 82 slides within the pinion 80.

At its upper end, the cardan shaft 82 is fitted with a bevel pinion 88, which meshes with a complementary pinion 89 mounted on the projecting end of a shaft 90, journalled in the bracket 86, concentric with the axis of swiveling movement of the housing 83. The shaft 90 extends horizontally into the base of the column 26 and has splined driving connection with a sleeve 91, that is rotatably journalled therein, the arrangement being such that the column may be moved toward or from the table without disturbing the driving connection between the shaft 90 and the sleeve 91. A clutch collar 92 is slidably splined on the sleeve 91 and arranged for axial sliding movement into clutching engagement with either one of a pair of reversing pinions 93 and 94 that are rotatably mounted on the sleeve. The pinions 93 and 94 mesh respectively with opposite sides of a complementary bevel gear 95, fixed on the lower end of an elevating screw 96, which extends vertical of and is rotatably mounted in the column 26, the arrangement being such that the screw may be driven in the one or the other direction selectively, depending upon which of the reversing pinions 93 and 94 is clutched to the sleeve 91. Movement of the clutch collar 92, to effect the desired driving connection, is accomplished by actuating a feed lever 97 (shown in Fig. 1) which operates the clutch collar through linkage in well known manner. The screw 96 has threaded engagement with a nut (not shown) fixed in the spindle head 28, the arrangement being such, that when the feed lever 97 is moved to its upper position, the driving connection effected causes the head to move upwardly. Similarly, when the lever is moved downward, the head moves in corresponding direction. A limit stop mechanism 98 (Fig. 2) of well known type is arranged to disengage the clutch collar 92 automatically when the head reaches its limit of travel in either direction. By this arrangement of power transmission mechanism, either one or both of the heads 28 and 29 may be caused to move vertically along its supporting column in synchronism with or independently of movement of the table 22 and regardless of the positions of the columns relative to the table.

For moving the heads manually, a hand wheel 99 is provided at the base of each column and interlocked with the power feed lever 97 in manner to prevent operation of the hand wheel when the power feed is engaged and vice versa. Each hand wheel 99 is connected to operate a bevel pinion (not shown) which meshes with a second bevel gear 101 mounted on the feed screw 96 above the bevel gear 95. The spindle heads 28 and 29 are each counterbalanced, to facilitate vertical movement, by counterweights (not shown) which are suspended within the columns by chains 105, the chains operating over pulleys (not shown) in the tops of the columns, to exert force upward upon the heads in well known manner.

In order that the spindle heads 28 and 29 may be positioned vertically with a high degree of precision, each head is provided with precision positioning apparatus including a sensitive dial indicator 106, arranged to cooperate with measuring rods supported in an improved measuring rod holder 107, fixed to the associated column. As appears in Figs. 1, 2 and 3, the measuring rod holders 107, each includes a bracket 109, extending forward from the top of the column for supporting a depending rod carrying bar or trough 110. As shown in the enlarged sectional view, Fig. 4, the trough bar 110 has sliding engagement with the adjacent part of the associated spindle head, the arrangement being such that the head is free to slide vertically relative to the bar and at the same time serves to support the bar against lateral displacement.

As shown in Fig. 9, the bar 110 is provided at its lower end with an adjustable abutment member 111 that is held in position by a clamping nut 112 and serves as the stationary or reference abutment upon which a column of measuring rods 113 of the required length is supported. The upper end of the rod column is engaged by one end of a pivotally mounted movable abutment lever 114, carried by the spindle head 29. As shown, the other end of the pivoted abutment lever 114 engages the stem of the dial indicator 106, the arrangement being such that in positioning the head 29, it may be moved downward slowly by actuating the hand wheel 99 until the abutment lever 114 engages the top of the measuring rod column. Further movement of the head then operates the dial indicator until its pointer indicates that the desired position has been reached.

As best shown in the enlarged view, Fig. 4, the rod holding bar 110 is recessed at one side to form a rod receiving trough or channel 115 presenting flat surfaces disposed at right angles for engaging and supporting the measuring rods 113 in vertical alignment. For retaining the rods 113 in the trough 115, the bar 110 is provided along its forward face with a series of spring clips 116, secured to the bar by a retaining strip 117, held by screws 118. As shown in the drawing, the rod engaging ends of the spring clips 116 are curled inwardly in manner to engage the rods in positions to force them into the angle of the trough 115, the springs being sufficiently resilient to permit ready insertion or removal of the rods as desired.

After the spindle head 29 has been established at an initial position for performing a first cutting operation relative to which other operations are to be precisely spaced, it is preferable that the column of measuring rods 113 be adjusted to even inches and the indicator 106 be set to indicate zero, as a basis for further measurements. To this end, a micrometer rod in the column of measuring rods 113 is adjusted to even inches and a suitable initial total length established by removing or inserting individual rods. Since the rod column may not engage the movable abutment lever 114, and the needle of the indicator 106 will ordinarily point to some figure other than zero, the apparatus is then brought to the zero position by first loosening the clamping nut 112 and then raising or lowering the adjustable abutment 111 and measuring rod column as may be required to establish the needle at zero. For precisely adjusting the abutment 111, there is provided a vertically disposed adjusting screw 120 that is rotatably mounted in a boss 121 on the lower end of the bar 110 and is threaded in the abutment. By turning the screw 120 to move the abutment and rod column up or down, the needle of the indicator 106 may be adjusted to the zero position and the abutment 111 then clamped to the bar 110 by tightening the clamping nut 112 to establish the initial position of the cutter 36, carried by the spindle head.

To position the head 29 at a second position, precisely spaced from the first position, the head may be moved upward a distance somewhat greater than required, by operation of the hand wheel 99. Additional measuring rods may then be clipped into the trough 115 above the initial column of rods and the micrometer rod adjusted to effect a total increment corresponding in length to the distance between the two positions. The head 29 is then lowered carefully by operation of the hand wheel 99 to engage the lever abutment 114 with the top of the new rod column, the movement being continued until the dial indicator 106, again reads zero. The head 29 and the cutter 36 carried by it, will then be positioned precisely at the predetermined distance from its first position. By following this procedure, either spindle head may be moved up or down from an initial position through a predetermined distance by adding to or removing from the column of rods in the associated rod holder 107, a total length of rods equal to the exact distance of movement required, the rods being removed or inserted with great facility simply by forcing them past the inturned retaining ends of the spring clips 116. After the head has been positioned and before the cutting operation is started, the head may be clamped rigidly to the column by actuating a head clamping lever 123.

Power for rotating the cutter driving spindles and for effecting axial feeding movements thereof, is derived from an electric motor 125, mounted on each head, as shown in the drawings. Referring particularly to the head 29, the motor 125 is directly connected to drive a speed changing mechanism housed within the head and that may be adjusted by a speed changing crank and indicating dial mechanism 126 for establishing a predetermined driving ratio. From the speed changing mechanism, power is transmitted by means of a splined shaft 127, into an upstanding housing 128, mounted on the rearwardly extending end of the spindle ram 32, as may best be seen in Fig. 9, the arrangement being such, that the splined shaft maintains a driving connection regardless of the position of the ram. Within the housing 128, the splined shaft 127 is provided with a gear 129, that meshes with a similar gear 130, fixed on a jack shaft 131. The jack shaft 131 is also splined and has slidably mounted thereon, a range change couplet 132, arranged to be meshed selectively with either a large slow speed gear wheel 133 or a high speed pinion 134, mounted on the tool spindle 34. The couplet 132 may be shifted by a range changing lever 135, mounted on the front of the housing 128, as shown in Fig. 1, the arrangement being such, that the spindle 34 may be driven at any speed within the combined ranges of the speed changing mechanism in the spindle head and the range changing mechanism on the ram.

Power for effecting axial feeding movements of the ram 32 and the spindle 34 carried by it, is derived directly from the spindle in order to provide for synchronized rotation and feeding movements for effecting thread cutting operations or the like. As shown in Fig. 9, the spindle 34 is provided for this purpose with a small driving gear wheel 137, that is mounted adjacent to the high speed gear wheel 133. As seen in Fig. 13, the feed gear 137 on the spindle meshes with an idler gear 138, which in turn drives a gear 139 mounted in the upper part of the housing 128. Referring to Fig. 10, it will be seen that the gear 139 is fixed on a sleeve 141, that is journalled in the housing and has splined driving connection with a shaft 142, extending into the interior of the head 29. Within the head, the shaft 142 carries a slidably mounted reversing clutch collar 143, that may be clutched selectively with either of two reversing bevel pinions 144 and 145, through operation of a reversing lever 146 mounted on the front of the spindle head, as shown in Fig. 1. The reversing bevel pinions 144 and 145 mesh with opposite sides of a complementary bevel gear 147, in such manner that the gear 147 may be driven in either direction to effect feeding movement of the ram 32 in selected relationship with the direction of rotation of the spindle, as determined by the setting of the lever 146.

The gear 147 is mounted on a stub shaft 148, which projects forward into a pickoff gear compartment 149, that is enclosed by a hinged door 150. Upon opening the door 150, the compartment 149 is made accessible, in order that suitable pickoff gears 151 may be applied for transmitting power at a desired feed rate from the shaft 148 to a parallel shaft 152 extending back into the head 29. Within the head, the shaft 152 is provided with range changing gears 153, that cooperate with a range changing couplet 154, which is slidably mounted on a splined shaft 155 for operation by a range changing lever 156, shown in Fig. 1. The shaft 155 also carries a gear 158 that meshes, in the manner indicated in Fig. 9, with a gear 159 which carries a bevel pinion 160, as shown in Fig. 11. The bevel pinion 160 meshes with a similar pinion 161, that is rotatably mounted on a feed shaft 162, disposed parallel with the spindle 34.

A clutch sleeve 163, slidably splined on the shaft 162, may be moved by a clutch lever 164, on the front of the head, into or out of clutching engagement with the pinion 161 for clutching it selectively to the shaft 162. A worm 165, formed on the shaft 162, meshes with a worm wheel 166, as best shown in Fig. 12. The worm wheel 166 is rotatably mounted on and selectively clutched to a shaft 167, that carries a feed pinion 168, which has meshing engagement with a rack 169, fixed on the ram 32, the arrangement being such that when the pinion 168 is rotated, it effects in or out feeding movement of the ram, the rate of feeding movement being proportioned to the rate of rotation of the spindle 34 in accordance with the transmission ratio established by the combined adjustment of the feed rate pickoff gears 151 and the range changing lever 156.

For effecting rapid movement of the ram, there is provided a manually actuated pilot wheel 171 that is keyed to the shaft 167 for turning it directly. A clutch collar 172, associated with the pilot wheel, is arranged for movement into or out of clutching engagement with the worm wheel 166, through tilting action of the pilot wheel spokes, whereby the clutch may be readily engaged to permit manual movement of the ram.

For effecting accurate positioning of the ram and the cutter 36, carried by its spindle, each spindle head is provided with a dial indicator 175, that is arranged to be actuated in well known manner, by a multiple position stop mechanism 176. To provide for accurate positioning of the ram, under guidance of the indicator 175, a small hand wheel 177, is arranged on the spindle head for moving the ram slowly. As shown in Fig. 11, the hand wheel 177 is fixed to a shaft 178, rotatably mounted in the head and carrying at its inner end a bevel pinion 179, that meshes with a complementary bevel pinion 180, fixed on the feed shaft 162. With the clutch 163 disengaged to uncouple the power feeding train, the ram feeding mechanism may be actuated by turning the hand wheel 177 until the dial indicator 175 indicates that the cutter 36 has been advanced to the desired position. The ram 32 may then be clamped to the head, through operation of a clamping mechanism, actuated by a detachable lever or crank, applied to a hexagonal socket in the outer end of a clamp actuating shaft 181.

As previously mentioned, movement of the table 22 is controlled as to rate and direction, either manually by operation of hand levers 65 on the sides of the bed, or automatically through operation of a tripping post 67 by dogs 68 mounted on the table. As shown in Fig. 7, the hand levers 65 and the tripping post 67, both operate upon a horizontally disposed control shaft 185, the arrangement being such that the shaft moves axially to effect change in direction of table movement, and rotates to effect change in the rate of movement. When the shaft 185 is rotated, a laterally projecting arm 191, operates to actuate a rapid traverse poppet valve 192 in a hydraulic control circuit that is generally similar in operation to the circuit shown and described in United States Patent No. 2,275,241, issued March 3, 1942.

Referring now to Fig. 8, rotary movement of the control shaft 185, to operate valve 192 and change the rate of table movement, may be effected automatically through vertical movement of a central plunger 193 in the tripping post 67. As shown, the lower end of the plunger 193, is notched to engage the end of an arm 194, fixed on the control shaft 185, the arrangement being such that when the plunger 193 is moved up or down, through action of tripping dogs on the table 22, the shaft 185 will be turned to actuate the rapid traverse poppet valve 192. Likewise, rotary movement of a sleeve 195, that encircles the plunger 193 and constitutes another part of the tripping post 67, operates to cause endwise movement of the shaft 185 through action of an extending arm 196, the end of which engages a shifting collar 197 on the shaft 185. The shifting collar 197 is also engaged by the end of a crank arm 198, that is connected to mechanism for effecting reversal in the direction of table movement in a well known manner.

Corresponding endwise and turning movements of the shaft 185, may likewise be effected by actuating either of the hand levers 65 on the respective sides of the bed 21. As best shown in Fig. 5, pivotal movement of the lever 65, toward or from the bed 21, results in in or out movement of a control rod 201. This in turn effects pivotal movement of a bell crank 202, one arm of which engages the control rod 201 and the other an arm 203, projecting from the shaft 185 to turn it. Another arm 204, on the shaft 185, engages a control rod 205, which extends through the bed 21 of the machine and is connected with the lever 65 on the other side of the bed. Accordingly, when either lever 65 is pivoted outward or away from the bed 21, the rods 201 and 205 move inwardly and the shaft 185 is turned in clockwise direction to effect table movement at rapid traverse rate. Conversely, when either lever is moved toward the bed, the rods move outwardly and the shaft is turned in counterclockwise direction to effect feed rate movement. When the left hand lever 65, shown in Fig. 5, is pivoted in a plane parallel with the table 22, it effects turning movement of a sleeve 207, encircling the rod 201. At its inner end, the sleeve 207 is provided with an arm 208, which is notched to engage the arm 203 on the shaft 185 in manner to provide for endwise movement of the shaft to select the direction of table movement. The control rod 205, which is connected with the lever 65 at the other side of the bed, projects into and is slidably keyed to the sleeve 207 in such manner, that both levers 65 move in synchronism and either may effect turning movement of the sleeve. By this arrangement, control of the table may be effected manually from either side of the machine bed or automatically through the tripping mechanism, by virtue of the interconnection of the two hand levers 65 and the tripping post 67 with the control shaft 185.

Fluid pressure for actuating the hydraulic control mechanism shown in Fig. 7 is derived from a pump 210, which draws fluid from a sump 211, through a suction pipe 212 and delivers it under pressure through a conduit 213. One branch of the pressure conduit 213, leads to the rapid traverse poppet valve 192, the arrangement being such, that when the control shaft 185 is turned clockwise, thereby opening the poppet valve 192, the pressure fluid flows through the valve into a conduit 215. The conduit 215 connects with a port 216 in a control cylinder 217, the port being ordinarily in communication with a port 218 from which a conduit 219 leads to a rapid traverse clutch mechanism (not shown) of well known type, the arrangement being such, that when pressure is admitted through the conduit 219, the clutch is engaged to effect movement of the table 22 or the heads 28 and 29 at rapid traverse rate.

A branch conduit 221 leads from the rapid traverse conduit 215, through a selector valve 222 to a conduit 223, leading to a pressure actuated switch 224. When pressure is applied to the switch 224, it operates to complete a control circuit 225, which functions to open a magnetically actuated switch 226, that operates to deenergize and stop the spindle driving motors 125, the arrangement being such, that when the rapid traverse drive is engaged, the spindle driving motors are stopped automatically to obviate marring the workpiece 37 as it moves rapidly past the cutters. The selector valve 222 is so arranged that when it is turned by a control lever 227 (Fig. 2) to another position, the conduit 223, leading to the pressure switch 224, is disconnected from the rapid traverse conduit 221, whereby the spindle motors 125 may be continued in operation regardless of whether or not the rapid traverse drive is engaged.

As previously mentioned, endwise movement of the control shaft 185 may be effected through action of a tripping dog on the table in turning the sleeve 195 of the tripping post 67. However, as soon as the control shaft 185 has been moved a sufficient distance to shift the reversing arm 198 to neutral position, movement of the table ceases, and it then becomes necessary to utilize other means to continue the movement of the shaft 185 if reversal of the direction of table movement is to be effected. This may be done manually by actuating one of the levers 65, or automatically through operation of an independent power operated reversing trip mechanism.

As shown in Fig. 7, there is provided at the sides of the tripping post 67, reversing trip plungers 231 and 232, respectively. These tripping plungers are connected by control conduits 233 and 234 to the respective ends of a reversing valve cylinder 235, the arrangement being such that when one or the other plunger is depressed by a reversing trip dog on the table, a reversing valve plunger 236 within the reversing cylinder 235 is moved in the one or the other direction. For example, if the right plunger 232 is depressed, it forces fluid through the conduit 234, into the left end of the valve cylinder 235, thereby moving the reversing valve plunger 236 to the right. With the valve in this position, fluid from the pressure conduit 213 flows through a port 237 in the wall of the cylinder 235, and into a port 238, from which a conduit 239 leads to the left end of the reversing cylinder 217. Fluid pressure in the left end of the cylinder 217 acts upon a reversing piston 241 within the cylinder, in manner to move it to the right. As shown, the respective ends of the piston 241 engage arms 242 and 243 depending from the control shaft 185, the arrangement being such that the shaft is moved endwise in accordance with movement of the piston 241 in the cylinder 217.

Likewise, when the left reversing plunger 231 is depressed, pressure is exerted through the control conduit 233 to the right end of the valve cylinder 235, thereby exerting pressure to move the reversing valve plunger 236 to the left. This results in permitting pressure fluid to flow from the pressure port 237, into a port 245, which is connected by a conduit 246 to the right end of the reversing cylinder 217, thereby effecting movement of the reversing piston 241 and the control shaft 185 to the left.

From the foregoing explanation, it will be apparent that whenever the control shaft 185 is moved endwise to a position for effecting feeding movement of the table 22 in selected direction, a reversing dog on the table will engage the appropriate reversing trip plunger at the end of the feeding stroke. This results in moving the control shaft 185 endwise to its other extreme position thereby actuating the reversing arm 198 through a full stroke of movement to effect reversal in direction of movement of the table.

Since it is usually desirable, at the end of a feeding stroke, to effect movement of the table in the opposite direction at rapid traverse rate for withdrawing the workpiece from the cutters, the control circuit is arranged to engage the rapid traverse drive automatically upon reversal. To this end ports 247 and 248 are provided near the ends of the reversing cylinder 217 in such positions that when the reversing piston 241 is moved to either end of the cylinder it uncovers one of these ports, thereby permitting pressure fluid to flow into a conduit 249, leading to a selector valve 250. With the selector valve in the position shown in the drawing, pressure fluid may flow through it into a conduit 251, leading to the lower end of a rapid traverse cylinder 252. Pressure in the cylinder 252 exerts force upwardly upon a rapid traverse piston 253 therein which acts upon an arm 254 projecting from the control shaft 185 in manner to turn the shaft in clockwise direction. As previously explained, this results in opening the rapid traverse poppet valve 192 and engaging the rapid traverse clutch while simultaneously stopping the spindle driving motors. When the reversing piston 253 moves upwardly, it establishes communication between neutralizing conduits 255 and 256, leading to the respective ends of the reversing valve cylinder 235, thereby permitting the valve plunger 236 to return to neutral position.

In the event that it is desired to effect return movement of the table 22 at feed rate instead of at rapid traverse rate, the selector valve 250 may be turned, by actuating a control lever 257 on the front of the machine (Fig. 2), to the position in which the pressure fluid is diverted from the conduit 251 to a conduit 258. The conduit 258 is connected with the rapid traverse cylinder 252 above the piston 253, in such position that the pressure exerts a downward force upon the piston and an upward force upon a spring biased neutralizing sleeve 259. This results in moving the sleeve 259 upward to establish communication between the neutralizing conduits 255 and 256, thereby neutralizing the reversing valve without engaging the rapid traverse drive or stopping the spindle motors.

In order that the reverse control plungers 231 and 232 may operate upon unbroken columns of fluid in their respective conduits 233 and 234, a branch 261 from the pressure conduit 213, leading from the pump 210, is connected to deliver a continuous flow of fluid into chambers 262, through which each plunger passes, the excess fluid overflowing through outlet openings 263. As shown in the drawing, each plunger 231, is provided with a radial passageway 264, which communicates with the chamber 262, when the plunger is in its upper position, and connects with a passageway that extends axially through the plunger into an actuating cylinder 265. The radial passageway 264 and the axial passageway constitute a hydraulic conduit leading into the actuating cylinder or hydraulic actuator 265. When the plunger is depressed by a trip dog, the passageway 264 is immediately moved out of communication with the chamber 262 and the fluid thus trapped within the cylinder 265 is forced through the connecting control conduit to actuate the reversing valve. By this arrangement, the control conduits 233 and 234, and their actuating cylinders 265, are always maintained full of the actuating fluid. In order to insure that no air is entrapped in any part of the control conduits and thereby provide for positive actuation of the reversing valve plunger 236, each end of the valve cylinder 235 is connected by a conduit 266, to a drain opening 267, closed by a plug 268. By removing the plug 268 and permitting a stream of fluid to flow through the conduits 233 and 234 from the chambers 262, air bubbles may be washed out and complete filling of the conduits insured.

From the foregoing detailed description of an illustrative milling and boring machine set forth herein to exemplify the present invention, it will be apparent that there has been provided an improved supporting structure and driving mechanism for the cutter spindles of a machine tool.

Although the illustrated embodiment of the invention has been described in considerable detail for the purpose of fully disclosing a practical working mechanism incorporating the invention, it is to be understood that the particular apparatus herein shown and described is intended to be illustrative only and that the various phases of the invention may be incorporated with advantage in other structural forms without departing from the spirit and scope of the invention as defined in the subjoined claims.

The principles of the invention having been fully explained in the foregoing description of embodying apparatus, we hereby claim as our invention or discovery:

1. In a milling machine, a base, a table slidably mounted for longitudinal feeding movement on said base, power actuated mechanism operatively connected to effect power feeding movement of said table, a saddle slidably mounted on said base adjacent to said table, a column slidably mounted on said saddle for movement transversely of the direction of movement of said saddle, a spindle head slidably mounted for movement on said column, a cutter spindle carried by said spindle head in cooperating relationship with said work supporting table, mechanism arranged to effect feeding movement of said head along said column, and an extensible power transmitting train operatively connecting said power actuated mechanism to said head feeding mechanism for effecting power feeding movement of said head along said column in synchronism with power feeding movement of said table regardless of the position of said column relative to said table.

2. In a milling machine, a base, a work supporting table slidably mounted on said base, power operated mechanism mounted in said base and operatively connected to effect power feeding movement of said table, columns upstanding at opposite sides of said table, said columns being movably mounted on said base for adjustment toward or from said table and longitudinally thereof, a cutter head slidably mounted on each of said columns, a cutter spindle rotatably mounted in each of said cutter heads in cooperative relationship with said work supporting table, mechanism operatively arranged to effect movement of each cutter head along its associated column, and an extensible power transmitting train operatively connected to transmit power to each of said cutter head moving mechanisms from said power operated mechanism in said base regardless of the positions of said columns on said base.

3. In a milling and boring machine, a base, a work supporting table slidably mounted for longitudinal feeding movement on said base, power operated mechanism arranged to effect power movement of said table in either direction at either feed rate or rapid traverse rate, a saddle slidably mounted on said base adjacent to said table, a column slidably mounted on said saddle for movement transversely of its direction of movement, a spindle head slidably movable on said column, a spindle quill slidably mounted in said head, a cutter spindle rotatably mounted in said quill in cooperating relationship with said table, mechanism arranged to effect feeding movement of said head along said column, a power transmitting train operatively connecting said power actuated mechanism in said base to said head feeding mechanism, a source of power carried by said head for driving said spindle and said quill, a speed changing mechanism mounted in said head and connected to be driven by said source of power, a feed rate changing mechanism likewise mounted in said head and connected to effect feeding movement of said quill, extensible power transmission mechanism operatively connecting said speed changing mechanism to said quill to drive it, power transmission mechanism operatively connecting said spindle to said feed rate changing mechanism in said head to drive it at spindle speed, a pressure actuated switch connected to control said spindle motor, a hydraulic control mechanism arranged to exert pressure in controlling the rate of movement of said table, and a control conduit interconnecting said control mechanism with said switch to cause said spindle motor to stop when pressure is exerted to effect table movement at rapid traverse rate.

4. In a milling and boring machine, a bed, a work supporting table movably mounted on said bed for operation at feed rate or at rapid traverse rate, a cutter spindle head mounted in cooperating relationship with said work supporting table, a spindle quill slidably mounted in said head, a cutter spindle rotatably mounted in said quill, a source of power carried by said head for driving said spindle and said quill, a speed changing mechanism mounted in said head and connected to be driven by said source of power, a feed rate changing mechanism likewise mounted in said head and connected to effect feeding movement of said quill, extensible power transmission mechanism operatively connecting said speed changing mechanism to said quill to drive it, power transmission mechanism operatively connecting said spindle to said feed rate changing mechanism in said head to drive it at spindle speed, a pressure actuated switch connected to control said spindle power source, a hydraulic control mechanism arranged to exert pressure in controlling the rate of movement of said table, and a control conduit interconnecting said control mechanism and said switch to cause said spindle power source to stop when pressure is exerted to effect table movement at rapid traverse rate.

5. In a machine tool having a movable member, a control system for controlling movement of said member including a control valve, a pair of hydraulic actuators arranged to effect movement of said control valve in opposite directions respectively, a trip mechanism responsive to movement of said member and including two tripping plungers, cylinders arranged to receive said plungers, and a hydraulic conduit leading from each of said cylinders to one of said hydraulic actuators, the arrangement being such that when one of said tripping plungers is actuated it operates through hydraulic pressure to move said control valve in the one direction while when the other tripping plunger is actuated it operates to move said control valve in the other direction.

6. In a milling and boring machine, a base, a table slidably mounted for longitudinal feeding movement on said base, power operated mechanism arranged to effect power movement of said table in either direction at either feed or rapid traverse rate, a control system for controlling movement of said table including a control valve, a pair of hydraulic actuators arranged to effect movement of said control valve in opposite directions respectively, a trip mechanism responsive to movement of said table and including tripping plungers, cylinders arranged to receive said plungers, hydraulic conduits leading from said cylinders to said hydraulic actuators for operating said control valve through hydraulic pressure, a tripping post operably disposed on said base and arranged to be operated by said table for controlling the direction and rate of table movement, a control lever, a single control shaft disposed to interconnect said lever and said tripping post, and hydraulic mechanical control means operating in response to turning movement of said shaft to control the rate of table movement and in response to endwise movement of said shaft to control the direction of table movement.

7. In a milling machine having a cutter spindle and a cooperating movable work supporting table, an electric motor operatively connected to drive said spindle, a pressure actuated switch connected to control said motor, power actuated driving mechanism arranged to move said table selectively at either feed rate or rapid traverse rate, hydraulic control mechanism arranged to exert pressure to control the rate of movement of said table, and a control conduit interconnecting said control mechanism and said switch in such manner that when pressure is exerted to cause table movement to occur at rapid traverse rate said switch will be actuated to stop said spindle driving motor.

8. In a machine tool having a bed and a member movably mounted on said bed, power operated mechanism arranged to effect movement of said member in either direction at either feed or rapid traverse rate, a tripping post disposed to be operated by said member in the course of its movement and operative when turned to control the direction of member movement and when moved endwise to control the rate of member movement, a control lever disposed at a position remote from said tripping post and operative when pivoted in one plane to control the direction of member movement and when pivoted in another plane to control the rate of member movement, a single control shaft interconnecting said lever and said tripping post, linkage operatively connecting said shaft to said lever and said tripping post in manner to cause said shaft to be turned to control the rate of member movement and to be moved endwise to control the direction of member movement, and control mechanism connected to be operated by said shaft when so moved and operative upon said power operated member moving mechanism to effect the aforesaid movements of said member.

9. In a milling and boring machine, a base, a table slidably mounted for longitudinal feeding movement on said base, power operated mechanism arranged to effect power movement of said table in either direction at either feed or rapid traverse rate, a control system for controlling movement of said table including a control valve, a pair of hydraulic acutators arranged to effect movement of said control valve in opposite directions respectively, a trip mechanism responsive to movement of said table and including tripping plungers, cylinders arranged to receive said plungers, hydraulic conduits leading from said cylinders to said hydraulic actuators for operating said control valve through hydraulic pressure, a tripping post arranged to be operated by said table for controlling the direction and rate of table movement, a control lever, a single control shaft interconnecting said lever and said tripping post, control mechanism operating in response to turning movement of said shaft to control the rate of table movement and in response to endwise movement of said shaft to control the direction of table movement, a saddle slidably mounted on said base adjacent to said table, a column slidably mounted on said saddle for movement transversely of its direction of movement, a spindle head slidably movable on said column, a spindle quill slidably mounted in said head, a cutter spindle rotatably mounted in said quill in cooperating relationship with said table, mechanism arranged to effect feeding movement of said head along said column, a power transmitting train operatively connecting said power actuated mechanism in said base to said head feeding mechanism, a source of power carried by said head for driving said spindle and said quill, a speed changing mechanism mounted in said head and connected to be driven by said source of power, a feed rate changing mechanism likewise mounted in said head and connected to effect feeding movement of said quill, extensible power transmission mechanism operatively connecting said speed changing mechanism to said quill to drive it, power transmission mechanism operatively connecting said spindle to said feed rate changing mechanism in said head to drive it at spindle speed, a pressure actuated switch connected to control said spindle motor, a hydraulic control mechanism arranged to exert pressure in controlling the rate of movement of said table, and a control conduit interconnecting said control mechanism and said switch to cause said spindle motor to stop when pressure is exerted to effect table movement at rapid traverse rate.

10. In a machine tool having a movable member, a hydraulic control system for controlling movement of said member including a control valve, a pair of hydraulic actuators operatively arranged to effect movement of said control valve in opposite directions respectively, a trip mechanism disposed to be actuated by said movable member in the course of its movement and including a pair of pressure cylinders, a pair of trip plungers disposed to operate in said pressure cylinders when acted upon by said movable member, resilient means arranged to bias said plungers to retracted position in which access to said cylinders is provided, a source of hydraulic fluid arranged to flow into each of said cylinders when the corresponding plunger is in retracted position to maintain said cylinders full of said fluid, and hydraulic conduits operatively connecting said cylinders to said hydraulic actuators respectively, whereby when the one of said trip plungers is actuated by said movable member it operates to trap fluid in its corresponding cylinder and exert pressure through its corresponding conduit and hydraulic actuator to move said control valve in the one direction and when the other of said plungers is actuated it operates in a like manner to move said control valve in the other direction.

11. In a machine tool having a work supporting table and a cooperating tool spindle, an electric motor operatively connected to drive said spindle, power operated mechanism arranged to drive said table at either feed rate or rapid traverse rate selectively, a hydraulic control system operatively connected to select the rate of table movement through pressure exerted to adjust said power operated mechanism, a pressure actuated switch arranged to control said spindle motor, and a conduit connecting said hydraulic control system to said pressure actuated switch in such manner that when pressure is exerted to adjust said power operated mechanism to drive said table at rapid traverse rate said switch is operated to stop said spindle driving motor.

12. In a milling and boring machine, a base, a table slidably mounted for longitudinal feeding movement on said base, power operated mechanism arranged to effect power movement of said table in either direction at either feed or rapid traverse rate, a control system for controlling movement of said table including a control valve, a pair of hydraulic actuators arranged to effect movement of said control valve in opposite directions respectively, a trip mechanism responsive to movement of said table and including tripping plungers, cylinders arranged to receive said plungers, hydraulic conduits leading from said cylinders to said hydraulic actuators for operating said control valve through hydraulic pressure, a tripping post arranged to be operated by said table for controlling the direction and rate of table movement, a control lever, a single control shaft interconnecting said lever and said tripping post, control mechanism operating in response to turning movement of said shaft to control the rate of table movement and in response to endwise movement of said shaft to control the direction of table movement, a spindle head mounted in cooperating relationship with said table, a spindle quill slidably mounted in said head, a cutter spindle rotatably mounted in said quill, a source of power carried by said head for driving said spindle and said quill, a speed changing mechanism mounted in said head and connected to be driven by said source of power, a feed rate changing mechanism likewise mounted in said head and connected to effect feeding movement of said quill, extensible power transmission mechanism operatively connecting said speed changing mechanism to said quill to drive it, power transmission mechanism operatively connecting said spindle to said feed rate changing mechanism in said head to drive it at spindle speed, a pressure actuated switch connected to control said spindle motor, a hydraulic control mechanism arranged to exert pressure in controlling the rate of movement of said table, and a control conduit interconnecting said control mechanism and said switch to cause said spindle motor to stop when pressure is exerted to effect table movement at rapid traverse rate.

13. In a machine tool, a base, a table movably mounted on said base, power actuated driving mechanism in said base arranged to drive said table at a selected feed rate or at rapid traverse rate, a tool supporting column mounted for movement in two directions on said base in cooperating relationship with said table, a spindle head movably mounted on said column, and an extensible power transmission train operatively connected to transmit power from said driving mechanism in said base to said movable column for moving said spindle head at a selected feed rate or at rapid traverse rate.

14. In a machine tool, a base, a platen movably mounted on said base, power driven mechanism mounted in said base and operatively connected to actuate said platen, a hydraulic control system including a control valve arranged to control said power driven mechanism, said control valve being movable by hydraulic pressure, a trip plunger mechanism arranged to be actuated by said platen in the course of its movement upon said base, said trip plunger mechanism being arranged to exert hydraulic pressure, and a conduit operatively connecting said trip plunger mechanism to said control valve, whereby said control valve may be actuated by remote control from said trip plunger mechanism.

15. In a milling machine, a base, a work table movably mounted on said base, a saddle slidably mounted on said base for movement in a plane transversely to said table movement, a cutter carrying column slidably mounted on said saddle, a spindle head slidably mounted on said column, feeding mechanism arranged to effect movement of said spindle head along said column, a source of power mounted in said base, means operatively connected to transmit power from said source to effect movement of said work table, and a power transmission train operatively connecting said source of power in said base to said feeding mechanism for effecting movement of said spindle head on said movable column.

16. In a machine tool having a selectively reciprocable table, means for driving said table in one direction or the other including a reversing clutch selectively positionable to effect reversal in the directional movement of said table, pressurized hydraulic circuit control means including a reversing valve operatively connected to effect selective movement of said reversing clutch, and a remote control system selectively operable to actuate said reversing valve and comprising a pair of piston actuators respectively provided with ports connected to receive fluid from said pressurized hydraulic circuit means, a pair of conduits normally disposed to receive fluid from the said ports in said piston actuators and respectively connected to effect movement of said reversing valve whenever one or the other of said piston actuators is operated, each of said piston actuators being respectively operable to simultaneously disconnect its respectively associated conduit from said hydraulic circuit means and to compress the fluid remaining in said conduit to actuate said reversing valve in a selected direction of movement, and a plurality of tripping dogs removably secured to said table in manner to operate one or the other of said piston actuators.

17. In a machine tool having a table disposed to be selectively moved in one direction or the other, power driven transmission means adapted to drive said table at rapid traverse rate or at a selected feeding rate, a motion interrupter interconnected between said transmission means and said table in manner to effect a selective reversal in the direction of movement thereof, a remote control system arranged to control the movement of said table including a movable member, said member being axially slidable to actuate said motion interrupter for effecting reversal in the direction of movement of said table and said member being rotatable to control said transmission means for driving said table at feed or rapid traverse rates, manual control means connected to move said member, mechanical control means connected to effect selective movement of said member independently of said manual control means, hydraulic circuit control means connected to effect movement of said member in cooperation with said mechanical control means, and a plurality of trip dogs selectively positionable on said table to coordinately actuate said mechanical control means and said hydraulic circuit control means in manner to effect a continuous cyclical control in the direction of movement of said table at a selected feed or rapid traverse rate.

18. In an automatic control system for effecting continuous cyclical control of a movable machine tool member, power operable means connected to effect selective movement of said member, a motion interrupter interconnected between said power operable means and said member to effect selective reversal in the direction of movement thereof, hydraulic circuit means including a directional sleeve valve operable to position said motion interrupter for effecting movement of said member in one direction or the other, a pair of piston actuators including a pair of conduits respectively interconnected with said sleeve valve in manner to initiate selective actuating movement thereof, means for maintaining said conduits filled with hydraulic fluid including a pair of pressurized overflow cylinders interconnected with said hydraulic control circuit, and means for depressing one or the other of said piston actuators respectively including a pair of reversing dogs selectively positionable on said member whereby said sleeve valve will be selectively actuated to effect an automatic reversal in the direction of movement of said member.

19. In a control system adapted to effect cyclical control of a selectively reciprocal member, power operable means connected to drive said member at a fast or slow rate of feed, a reversing clutch interconnected between said power operable means and said member in a manner to effect a selective reversal in the directional movement thereof, an axially slidable control shaft mechanically connected to directly actuate said reversing clutch, said control shaft arranged to have pivotal movement for actuating said power operable means to drive said member at a fast or slow rate respectively, manually operable control means connected to effect pivotal movement and axially slidable movement of said control shaft, mechanical means operatively connected to effect movement of said control shaft independently of said manual means, hydraulic circuit control means connected to effect movement of said control shaft in coordinated relationship with said mechanical means, and a plurality of trip dogs removably carried by said member in a manner to effect coordinated operation of said mechanical control means and said hydraulic circuit control means whereby said member may be continuously reciprocated selectively at a fast or slow feed rate.

JOSEPH B. ARMITAGE.
ORRIN W. BARKER.

REFERENCES CITED

The following references are of record in the file of this patent:

UNITED STATES PATENTS

| Number | Name | Date |
|---|---|---|
| 1,375,694 | Haldeman | Apr. 26, 1921 |
| 1,517,431 | Jones | Dec. 2, 1924 |
| 1,699,493 | Robinson | Jan. 15, 1929 |
| 2,006,746 | Poole | July 2, 1935 |
| 2,065,326 | Ernst et al. | Dec. 22, 1936 |
| 2,134,743 | Strawn | Nov. 1, 1938 |
| 2,158,649 | Armitage | May 16, 1939 |
| 2,224,108 | Ridgway | Dec. 3, 1940 |
| 2,244,026 | Schauer | June 3, 1941 |
| 2,245,558 | Johnson | June 17, 1941 |
| 2,263,404 | Armitage et al. | Nov. 18, 1941 |
| 2,308,688 | Hassman | Jan. 19, 1943 |
| 2,354,414 | Walter | July 25, 1944 |
| 2,400,815 | Forman | May 21, 1946 |
| 2,407,913 | Armitage et al. | Sept. 17, 1946 |
| 2,434,750 | Trecker et al. | Jan. 20, 1948 |